(12) United States Patent
Nakamiya et al.

(10) Patent No.: US 7,520,674 B2
(45) Date of Patent: Apr. 21, 2009

(54) MAGNETIC DISK DEVICE WITH ROTOR SUPPORTED BY FLUID BEARING

(75) Inventors: Teruhiro Nakamiya, Ibaraki (JP); Takehiko Eguchi, Ibaraki (JP); Takashi Kouno, Ibaraki (JP); Hitoshi Shindo, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 245 days.

(21) Appl. No.: 11/303,282

(22) Filed: Dec. 15, 2005

(65) Prior Publication Data

US 2006/0133705 A1 Jun. 22, 2006

(30) Foreign Application Priority Data

Dec. 16, 2004 (JP) ............................. 2004-364296

(51) Int. Cl.
*F16C 32/06* (2006.01)
*H02K 7/08* (2006.01)
*G11B 5/012* (2006.01)

(52) U.S. Cl. .................... 384/100; 384/107; 310/90; 310/67 R; 360/98.01

(58) Field of Classification Search ................ 384/100, 384/107, 110–114, 130, 144, 119; 310/90, 310/67 R, 89.91; 360/98.07, 98, 99.08, 99.06, 360/98.01–98.03
See application file for complete search history.

(56) References Cited

U.S. PATENT DOCUMENTS 4,835,637 A * 5/1989 Mach et al. .............. 360/98.01
4,996,613 A * 2/1991 Hishida .................... 360/99.08
5,212,607 A * 5/1993 Elsing et al. ............. 360/99.08
6,217,218 B1 * 4/2001 Inoue et al. ................. 384/119
6,384,495 B1 * 5/2002 Suzuki et al. ............. 310/67 R
6,657,340 B2 * 12/2003 Obara ......................... 310/90
6,657,342 B2 * 12/2003 Kodama ...................... 310/90
6,834,996 B2 * 12/2004 Gomyo et al. .............. 384/100
2004/0156568 A1 * 8/2004 Woldemar et al. .......... 384/100

FOREIGN PATENT DOCUMENTS

| EP | 769628 A1 * | 4/1997 |
| JP | 08335366 A * | 12/1996 |
| JP | 11191945 A * | 7/1999 |

(Continued)

*Primary Examiner*—Marcus Charles
(74) *Attorney, Agent, or Firm*—Townsend and Townsend and Crew LLP; Darren Gold (57) ABSTRACT

Embodiments of the invention make high-speed rotation of a magnetic disk, suppression of an increase in electric power consumption, and suppression in shaft falling vibration compatible together in a magnetic disk device. In one embodiment, a magnetic disk device comprises a magnetic disk that records information, and a drive unit that rotates the magnetic disk about a shaft. The drive unit comprises a rotary section that holds the magnetic disk, and a stationary section that supports the rotary section through a fluid bearing. The fluid bearing comprises a radial fluid bearing that bears a load in a direction perpendicular to an axial direction, and a thrust fluid bearing that bears a load in the axial direction. The thrust fluid bearing comprises a first thrust fluid bearing having a small diameter and a shallow clearance, and a second thrust fluid bearing positioned outside an outer periphery of a shaft and being larger in diameter and deeper in clearance than the first thrust fluid bearing.

13 Claims, 8 Drawing Sheets

FOREIGN PATENT DOCUMENTS

| | | | |
|---|---|---|---|
| JP | 2000-306319 | | 11/2000 |
| JP | 2002125344 A | * | 4/2002 |
| JP | 2002291199 A | * | 10/2002 |
| JP | 2003174748 A | * | 6/2003 |
| JP | 2003319602 A | * | 11/2003 |
| JP | 2003329033 A | * | 11/2003 |

* cited by examiner

MAGNETIC DISK DEVICE WITH ROTOR SUPPORTED BY FLUID BEARING

CROSS-REFERENCES TO RELATED APPLICATIONS

This application claims priority from Japanese Patent Application No. JP2004-364296, filed Dec. 16, 2004, the entire disclosure of which is incorporated herein by reference.

BACKGROUND OF THE INVENTION

The present invention relates to a magnetic disk device, and is specifically suited to a magnetic disk device, in which a rotary section including a shaft is supported through a fluid bearing.

In magnetic disk devices for recording/reproduction of data, there is a need for a large volume of recorded data and for an increase in data transmission speed by virtue of performing a work for recording/reproduction of data at high speed. In order to meet the need, it is effective to increase the number of revolutions of a magnetic disk to reduce time for access to a data storage location. As magnetic disk devices used as a server, models, in which a magnetic disk makes 10,000 revolutions per minute, constitute the mainstream while high-speed rotating machines making 15,000 revolutions per minute have appeared in recent years and high-speed rotation of a magnetic disk has become the trend in the market.

When a magnetic disk is rotated at high speed, however, there are increased frictional torque called windage loss between the magnetic disk and air and frictional torque of a bearing called bearing loss. Therefore, it is necessary to supply much torque to a spindle motor, which leads to an increase in electric power consumption. An increase in electric power consumption brings about large electric current and temperature rise in an associated device, for which there is tolerance determined by specifications of parts in the device, so that it becomes difficult to increase electric power consumption beyond a conventional one. In, for example, high-speed rotating machines, in which a magnetic disk makes 15,000 revolutions per minute, the diameter of the magnetic disk is decreased to 65 mm from 84 mm of a conventional one to reduce windage loss to restrict an increase in electric power consumption. When a magnetic disk is made small, it is reduced in recording capacity, so that in order to attain high-speed rotation further in the future, other techniques for reduction in electric power consumption than making a magnetic disk small in diameter are demanded.

On the other hand, in magnetic disk devices of recent years, the demand for small vibration and low noise begins, instead of ball bearings the use of dynamic oil pressure bearings, which use oil for a working fluid, as bearings for spindle motors (for example, JP-A-2000-306319 (Patent Document 1)). Since fluid bearings involve generation of frictional loss called bearing loss between oil and a sleeve made of metal or the like, it is also important to reduce bearing loss in rotating a magnetic disk at high speed. In particular, since a ratio occupied by bearing loss in total electric power consumption increases when a magnetic disk is made small to reduce windage loss, reduction in bearing loss contributes much to reduction in electric power consumption.

For reduction in bearing loss, it is effective to make a bearing small in diameter to reduce a frictional surface. In order to achieve this, it is effective to make a shaft, that is, a rotating shaft of a spindle motor, on which a bearing is mounted, small in diameter. Since the diameter of a shaft has an effect of the fourth power thereof on stiffness of the shaft, however, there is a disadvantage that making the diameter small leads to much reduction in stiffness of the shaft to cause elastic deformation of the shaft, so that vibration accompanied by falling of the shaft becomes large. When a shaft falls, a head is worsened in positioning accuracy to make high recording density difficult, so that it is important to suppress shaft falling vibration. In recent years, there is a tendency to the use of a simple rotating shaft construction due to the demand for reduction in cost, in which case a cantilever arrangement with only one end of a shaft fixed is used, so that stiffness is small and vibration accompanied by falling of the shaft becomes further large.

BRIEF SUMMARY OF THE INVENTION

Here, in order to suppress vibration (shaft falling vibration) accompanied by falling of a shaft of a spindle motor, it is conceivable to increase a thrust fluid bearing in diameter. When the thrust fluid bearing is simply made large in diameter, an increase in stiffness can be achieved but there is caused a problem that bearing loss is increased to lead to an increase in electric power consumption.

It is a feature of the invention to provide a magnetic disk device capable of making high-speed rotation of a magnetic disk, suppression of an increase in electric power consumption, and suppression in shaft falling vibration compatible together.

In accordance with an aspect of the invention, a magnetic disk device comprises a magnetic disk that records information, and a drive unit that rotates the magnetic disk about a shaft. The drive unit comprises a rotary section that holds the magnetic disk, and a stationary section that supports the rotary section through a fluid bearing. The fluid bearing comprises a radial fluid bearing that bears a load in a direction perpendicular to an axial direction, and a thrust fluid bearing that bears a load in the axial direction. The thrust fluid bearing comprises a first thrust fluid bearing having a small diameter and a shallow clearance, and a second thrust fluid bearing positioned outside an outer periphery of the shaft and being larger in diameter and deeper in clearance than the first thrust fluid bearing.

Preferred specific constitutions of the invention are as follows.

(1) The rotary section comprises a shaft that defines a center of rotation, a hub fixed to the shaft to hold the magnetic disk, and a motor rotor that rotates the hub; the stationary section comprises a sleeve arranged on an outer periphery of the shaft, and a motor stator; the radial fluid bearing is formed between the shaft and the sleeve; and the second thrust fluid bearing is formed between the sleeve and the hub.

(2) Juxtaposed between an upper surface of the sleeve and a lower surface of the hub are the first thrust fluid bearing on an inner peripheral side and the second thrust fluid bearing on an outer peripheral side.

(3) The first thrust fluid bearing comprises an upper thrust fluid bearing formed between an upper surface of the sleeve and a lower surface of the hub, and a lower thrust fluid bearing formed between a lower surface of the shaft and a bottom surface of the sleeve.

(4) The second thrust fluid bearing is defined by a groove formed wholly circumferentially on the upper surface of the sleeve.

(5) The second thrust fluid bearing has a proportional coefficient of bearing stiffness and beading damping that ranges from about 0.15 to 0.001.

(6) The second thrust fluid bearing is formed by an inclined surface inclined so as to become deep in clearance radially outwardly of the first thrust fluid bearing formed on the upper surface of the sleeve.

(7) The stationary section comprises a shaft that defines a center of rotation, first sleeves fixed to an outer periphery of the shaft, and a motor stator, and the rotary section comprises a second sleeve arranged on the outer periphery of the shaft, a hub fixed to the second sleeve to hold the magnetic disk, and a motor rotor that rotates the hub, and wherein the radial fluid bearing is formed between the shaft and the second sleeve, and the first thrust fluid bearing and the second thrust fluid bearing are formed between the first sleeves and the second sleeve.

(8) The first sleeves are arranged above and below the second sleeve, and the first thrust fluid bearing and the second thrust fluid bearing are formed between upper and lower surfaces of the second sleeve and the respective first sleeves.

According to the invention, it is possible to provide a magnetic disk device capable of making high-speed rotation of a magnetic disk, suppression of an increase in electric power consumption, and suppression in shaft falling vibration compatible together.

DETAILED DESCRIPTION OF THE INVENTION

Several embodiments of the invention will be described below with reference to the drawings. The same reference numerals in the drawings of the respective embodiments denote the same or equivalent elements.

A magnetic disk device according to a first embodiment of the invention will be described with reference to FIGS. 1 to 12.

Figure 1:
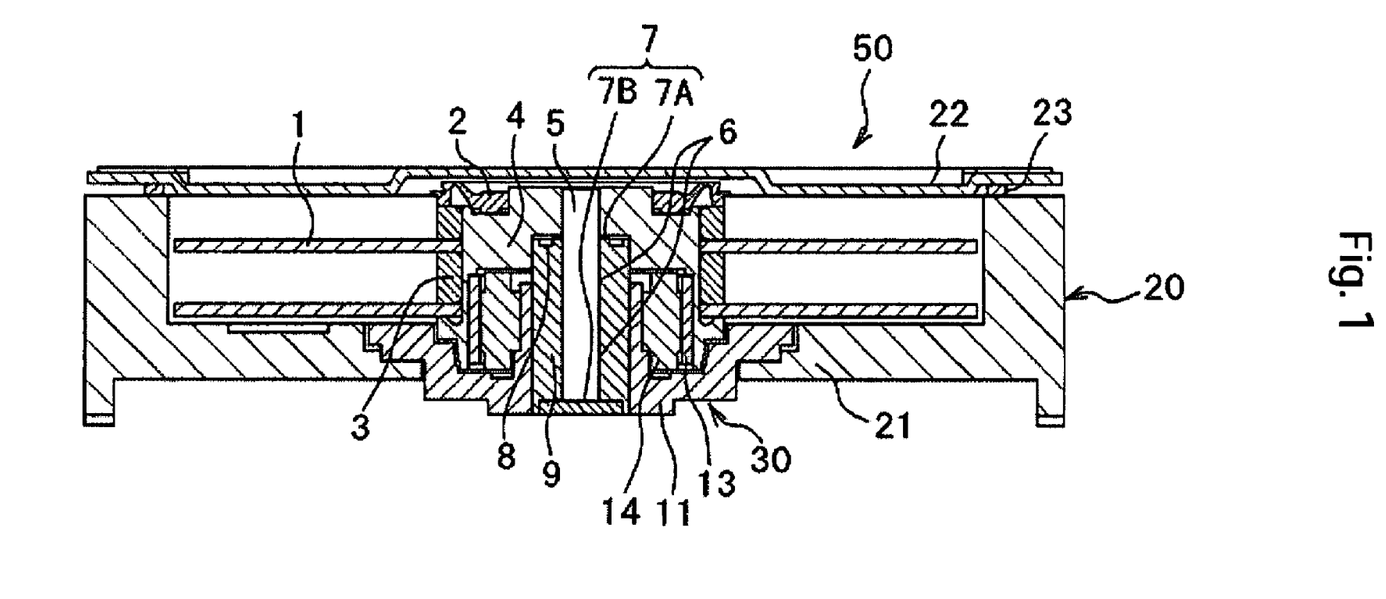
FIG. 1 is a view showing a longitudinal cross section of a magnetic disk device according to a first embodiment of the invention.

A magnetic disk device 50 according to the embodiment will be described with reference to FIG. 1. FIG. 1 is a view showing, in longitudinal cross section, a drive unit of the magnetic disk device according to the embodiment.

The magnetic disk device 50 comprises constituent elements mounted in a closed housing 20, the constituent elements being composed of magnetic disks 1 that record information, a magnetic head provided on a tip end of a carriage to record or reproduce the information, and a drive unit 30 that rotates the magnetic disks 1 about a shaft 5. The housing 20 comprises a base 21, a cover 22 that covers the base 21, and a sealing member 23 that provides sealing between the base 21 and the cover 22.

The drive unit 30 comprises a rotary section composed of a clamp 2, spacers 3, a hub 4, a shaft 5, and a motor rotor 13, and a stationary section composed of a sleeve 9, a bracket 11, and a motor stator 14. In addition, a spindle motor is composed of the cylindrical-shaped motor rotor 13 and the motor stator 14 arranged inside the motor rotor. Electric current is supplied to the motor stator 14 whereby the motor rotor 13 is rotated and the rotary section is rotated.

Conventionally, drive units in general magnetic disk devices include a rotating shaft construction, in which a shaft rotates, and a fixed shaft construction, in which a shaft does not rotate. The magnetic disk device 50 according to the embodiment adopts the former rotating shaft construction. A magnetic disk device 50 adopting the latter fixed shaft construction will be described in a second embodiment described later.

The motor rotor 13 is fixed to an inner periphery of a lower portion of the hub 4, and as the motor rotor 13 rotates, the hub 4 is rotated. A plurality of magnetic disks 1 are fixed to an outer periphery of the hub 4 through the spacers 3, and as the hub 4 rotates, the magnetic disks 1 are rotated. The spacer 3 on an uppermost step of the outer periphery of the hub 4 is clamped by the clamp 2 whereby the spacer 3 and the magnetic disks 1 are held. The shaft 5 is fixed to an inner periphery of an upper portion of the hub 4, and as the hub 4 rotates, the shaft 5 is rotated.

Figure 2:
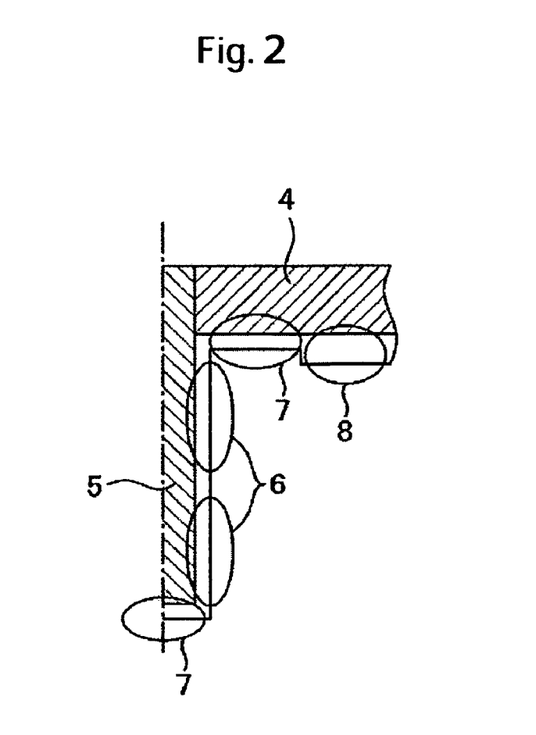
FIG. 2 is an enlarged view showing a fluid bearing portion in FIG. 1.

Subsequently, fluid bearings 6 to 8 that support the shaft 5 and the hub 4 will be described with reference to FIGS. 1 and 2. FIG. 2 is an enlarged view showing a fluid bearing portion in FIG. 1.

The hub 4 and the shaft 5 are supported on the sleeve 9 through a radial fluid bearing 6 and a plurality of thrust fluid bearings 7, 8. In other words, a fluid is filled between the hub 4 and the shaft 5, and the sleeve 9 to form the radial fluid bearing 6, the first thrust fluid bearing 7, and the second thrust fluid bearing 8. Owing to such arrangement, a load in a direction perpendicular to the shaft 5 is born by the radial fluid bearing 6, and a load in an axial direction of the shaft 5 is born by the thrust fluid bearings 7, 8, so that low vibration and low noise can be realized as compared with that arrangement, in which the hub 4 is supported by ball bearings.

The radial fluid bearing 6 is provided at two locations (top and bottom) in order to provide for a rotational stiffness in the direction perpendicular to the shaft 5. In order to balance upward and downward forces in the axial direction to each other, the first thrust fluid bearing 7 comprises two upper and lower thrust fluid bearings 7A, 7B but one of them is sometimes substituted by a stopper, in which case the thrust fluid bearing 7 is one in number. The thrust fluid bearing 7A is formed between a lower surface of the shaft 5 and a lower surface of the sleeve 9, and the thrust fluid bearing 7B is positioned outside an outer periphery of the shaft 5 and formed between an upper surface of the shaft 5 and a lower surface of the hub 4.

The second thrust fluid bearing 8 is positioned outside an outer periphery of the thrust fluid bearing 7A and formed between an upper surface of the sleeve 9 and the lower surface of the hub 4 to have a deeper clearance than that forming the thrust fluid bearing 7A. In other words, the thrust fluid bearing 8 is formed to be larger in diameter and deeper in clearance than the first thrust fluid bearing 7. The provision of the thrust fluid bearing 8 makes it possible for a simple construction to reduce shaft falling vibrations inexpensively. In addition, a clearance that forms the thrust fluid bearing 8 is defined by a groove, which has a rectangular cross section and is formed entirely circumferentially on the upper surface of the sleeve 9 (a surface that forms the thrust fluid bearing 7A).

The sleeve 9 is fixed to the bracket 11 fixed to a base 10. Accordingly, the sleeve 9 and the motor stator 14 are fixed to the base 10 through the bracket 11. In addition, the sleeve 9 or the motor stator may be fixed directly to the base 10.

Figure 3:
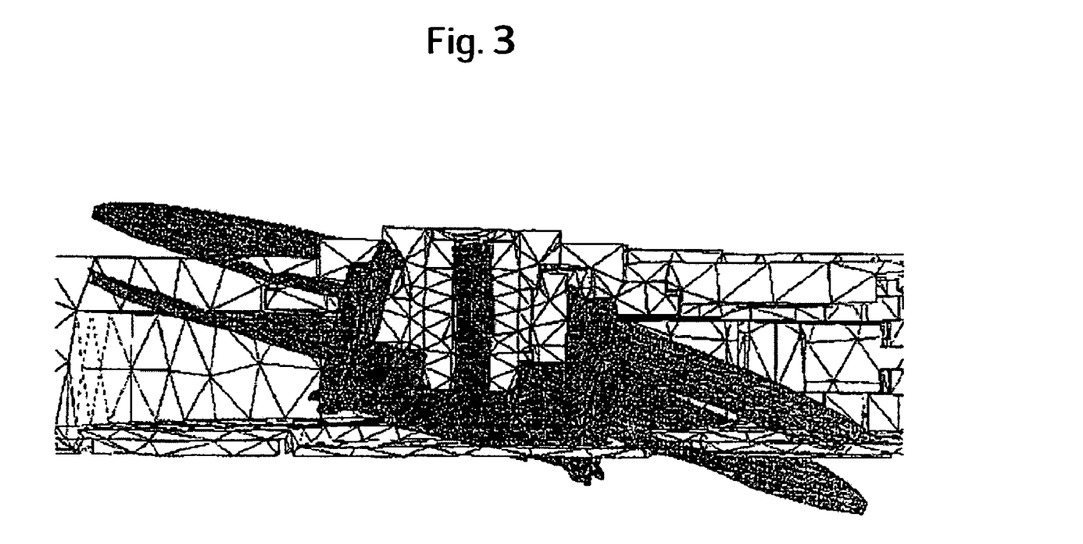
FIG. 3 is a view showing a mode of shaft falling vibration in a magnetic disk device, in which a second thrust fluid bearing is not used.

Subsequently, a mode of shaft falling vibration of the shaft 5 will be described with reference to FIG. 3. FIG. 3 is a view showing a mode of shaft falling vibration in the case where the thrust fluid bearing 8 is not used. However, FIG. 3 shows the mode in exaggeration with a magnification of deformation being made large.

When the shaft 5 is decreased in diameter in order to suppress an increase in electric power consumption, attributable to high-speed rotation of the magnetic disks 1, the shaft 5 is decreased in stiffness, so that shaft falling vibration, in which the shaft 5 is elastically deformed, becomes large. FIG. 3 shows the state of shaft falling vibration by representing the rotary section in shadow. In contrast, according to the embodiment, the thrust fluid bearing 8 is provided between the hub 4 and the sleeve 9 outside the thrust fluid bearing 7. Thereby, since the shaft 5 is apparently increased in diameter and increased in supporting stiffness and damping of the thrust fluid bearing 8 can be made use of, it is possible to reduce the shaft falling vibration.

Figure 4:
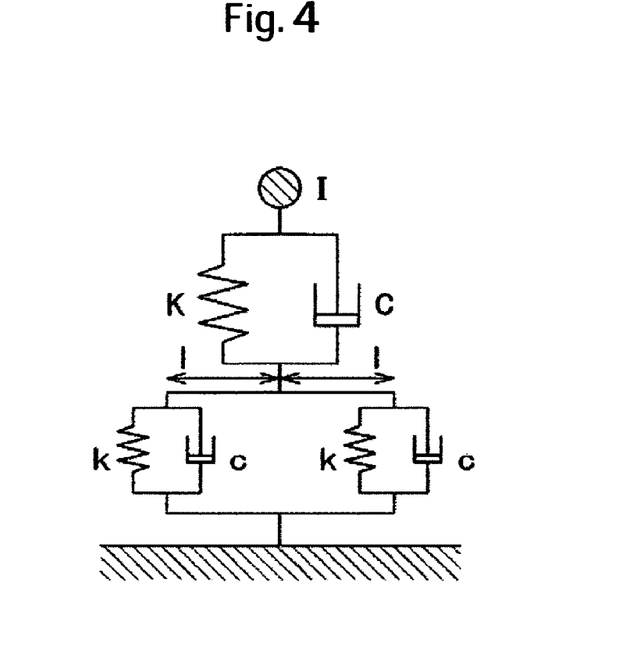
FIG. 4 is a view showing a simple vibration model of a spring-mass-dashpot system related to a conventional bearing.
Figure 6:
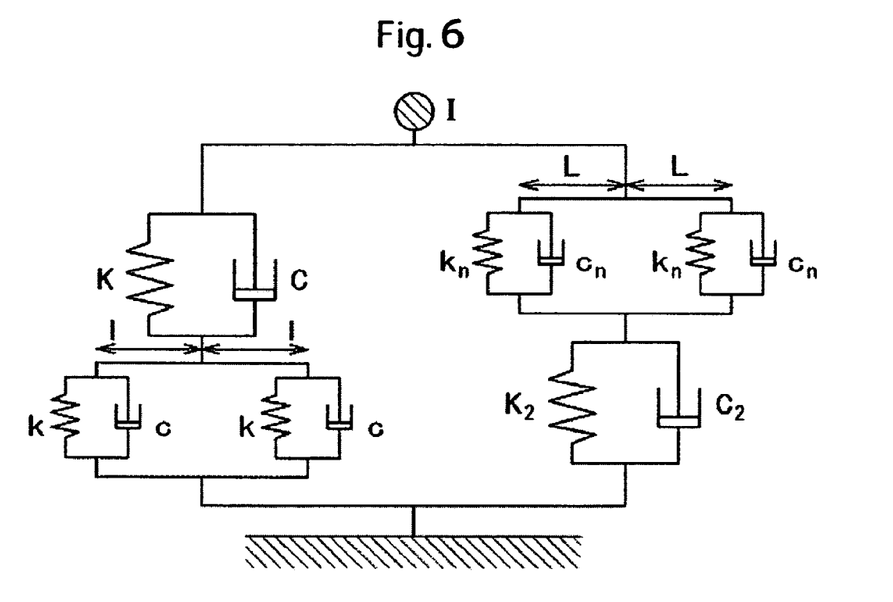
FIG. 6 is a view showing a simple vibration model of a spring-mass-dashpot system related to a bearing according to the first embodiment.
Figure 7:
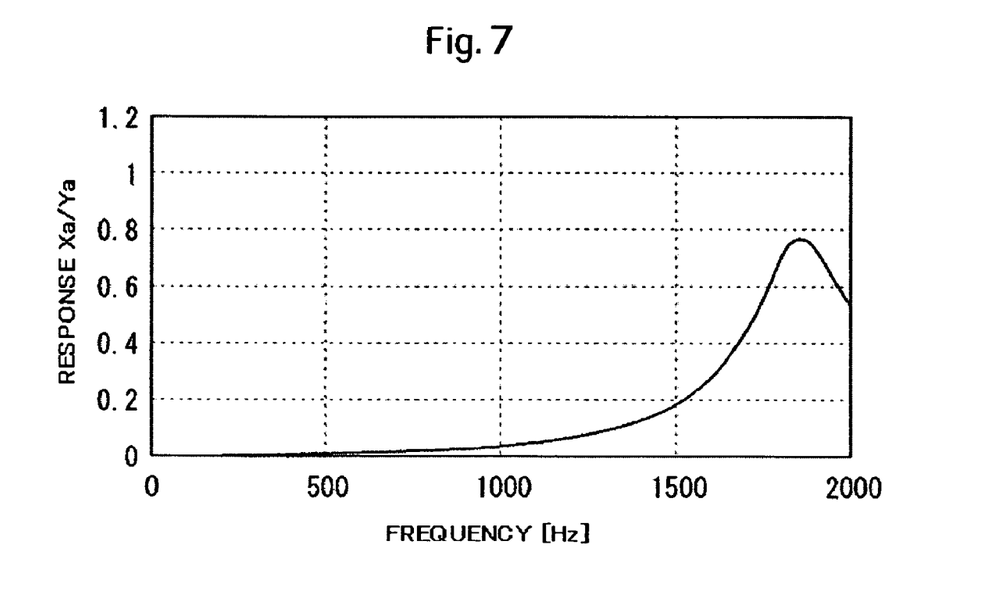
FIG. 7 is a view showing a frequency response characteristics of FIG. 6.
Figure 8:
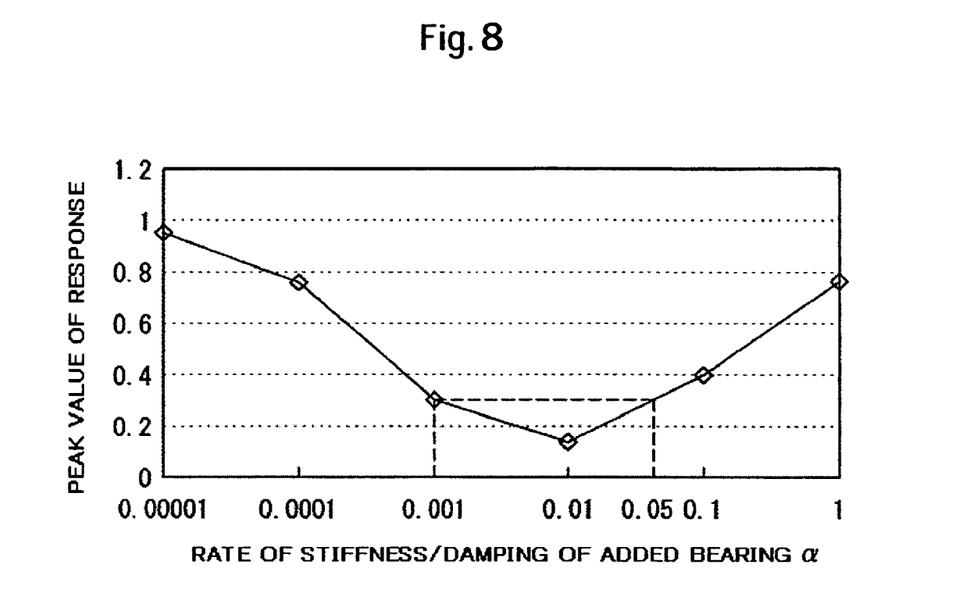
FIG. 8 is a view showing the relationship between a rate of stiffness/damping and magnitude of shaft falling vibration in the bearing according to the first embodiment.
Figure 9:
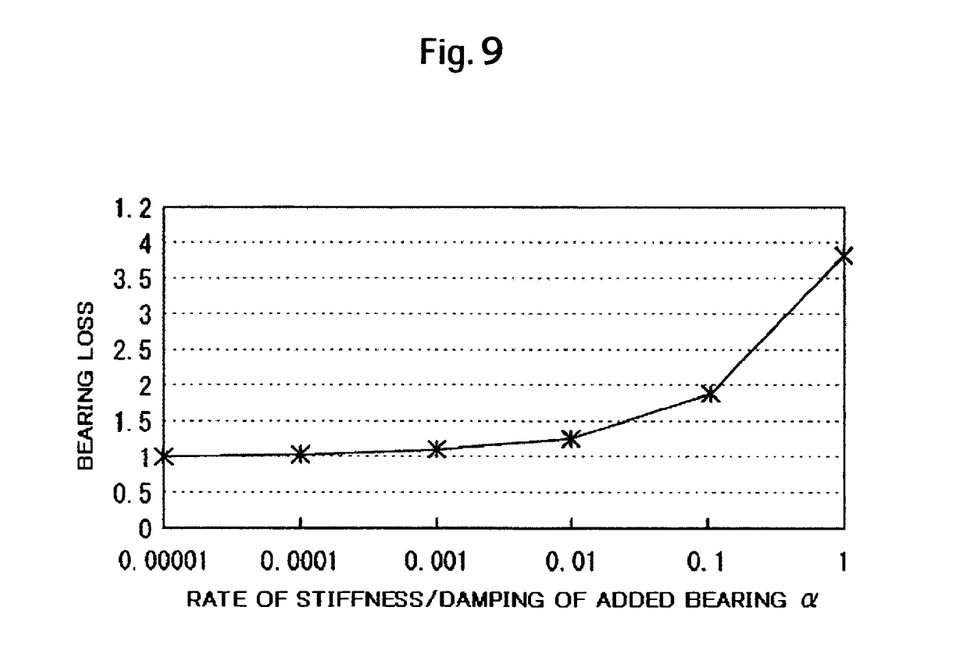
FIG. 9 is a view showing the relationship between a rate of stiffness/damping and bearing loss in the first embodiment.

The effect of reducing the shaft falling vibration will be specifically described with reference to FIGS. 4 to 7. FIG. 4 is a view showing a simple vibration model of a spring-mass-dashpot system related to a conventional bearing, F*ig*. 5 is a view showing a frequency response characteristics of FIG. 4, FIG. 6 is a view showing a simple vibration model of a spring-mass-dashpot system related to a bearing of the embodiment, FIG. 7 is a view showing a frequency response characteristics of FIG. 6, FIG. 8 is a view showing the relationship between a rate of stiffness/damping and magnitude of shaft falling vibration in the bearing of the embodiment, and FIG. 9 is a view showing the relationship between a rate of stiffness/damping and bearing loss in the bearing of the embodiment.

In FIG. 4, I indicates moment of inertia of the rotary section, k bearing stiffness, 1 a bearing diameter, c bearing damping, K shaft stiffness, and C shaft damping. Taking one spring and dashpot, which are equivalent to the system, into consideration, effective stiffness $K_e$, is represented by a formula (1), effective damping $C_e$ is represented by a formula (2), relative displacement response $X_a/Y_a$ of mass at the time of displacement and vibration is represented by a formula (3), $\omega_n$ in the formula (3) is represented by a formula (4), and $\zeta$ is represented by a formula (5).

Formula 1
$$K_e = \frac{(Kkl - \omega^2 Ccl)(K + kl) + \omega^2(Kcl + Ckl)(C + cl)}{(K + kl)^2 + \omega^2(C + C1)^2} \quad (1)$$

Formula 2
$$C_e = \frac{(Kcl + Ckl)(K + kl) - (Kkl + \omega^2 cCl)(C + cl)}{(K + kl)^2 - \omega^2(C + C1)^2} \quad (2)$$

Formula 3
$$\frac{X_a}{Y_a} = \frac{\left(\frac{\omega}{\omega_n}\right)^2}{\sqrt{\left\{1 - \left(\frac{\omega}{\omega_n}\right)^2\right\}^2 + \left(2\xi\frac{\omega}{\omega_n}\right)^2}} \quad (3)$$

Formula 4
$$\omega_n = \sqrt{\frac{K_e}{I}} \quad (4)$$

Formula 5
$$\xi = \frac{K_e}{2\sqrt{IK_e}} \quad (5)$$

Figure 5:
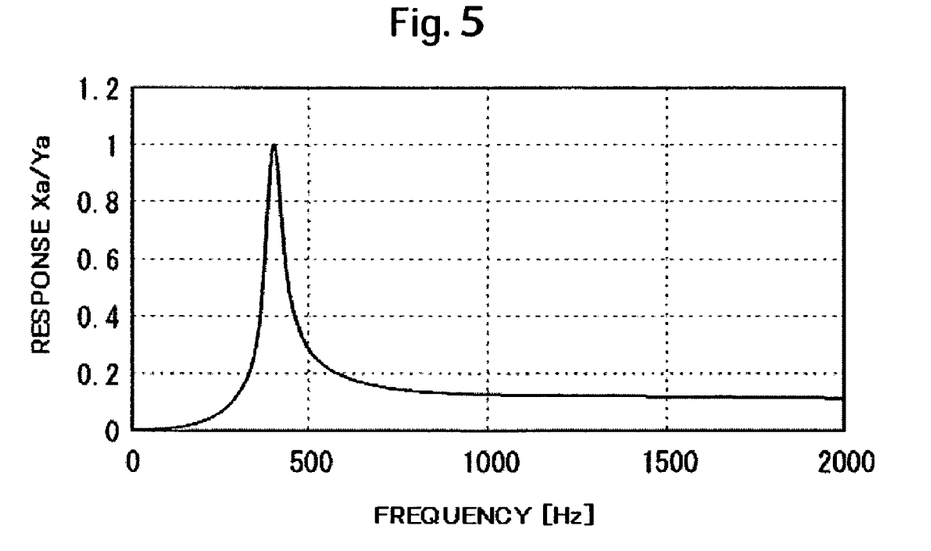
FIG. 5 is a view showing a frequency response characteristics of FIG. 4.

A frequency response shown in FIG. 5 is given by calculation with the use of the following values for the formulae (1) to (5) in the prior art. In addition, in the frequency response, $Y_a$ indicates magnitude of vibrational displacement and $X_a$ indicates magnitude of output displacement. Also, an axis of ordinate in FIG. 5 is normalized by a peak value.

$I=3.64\times10^{-6}$[kg·m²]

K=23[N/m]

$C=9.15\times10^{-4}$[Ns/m]

l=0.016[m]

$k=1.57\times10-6$[N/M]

$c=1.58\times10^3$[Ns/m]

In contrast, FIG. 6 shows a model of a bearing in the case where a thrust fluid bearing 8 is added. Writing L for diameter, $k_n$ for bearing stiffness, and $c_n$ for bearing damping in the newly added thrust fluid bearing 8, $K_2$ indicates stiffness of the sleeve 9 that supports the rotary section through the thrust fluid bearing 8, and $C_2$ indicates damping. At this time, effective stiffness $K_{e2}$ is represented by a formula (6), effective damping $C_{e2}$ is represented by a formula (7), $k_n$ in the formulae (6) and (7) is represented by a formula (8), and $c_n$ is represented by a formula (9).

Formula 6
$$K_{e2} = K_e + \frac{(K_2 k_n L - \omega^2 C_2 c_n L)(K_2 + k_n L) + \omega^2(K_2 c_n L + C_2 K_n L)(C_2 + c_n L)}{(K_2 + k_n L)^2 + \omega^2(C_2 + c_n L)^2} \quad (6)$$

-continued

Formula 7

$$C_{e2} = C_e + \frac{(K_2 c_n L + C_2 c_n L)(K_2 + k_n L) - (K_2 k_n L - \omega^2 C_2 k_n L)(C_2 + c_n L)}{(K_2 + k_n L)^2 + \omega^2 (C_2 + c_n L)^2} \quad (7)$$

Formula 8

$$k_n = \alpha k \quad (8)$$

Formula 9

$$C_n = \alpha C \quad (9)$$

A frequency response of mass at the time of displacement and vibration, shown in FIG. 7, is given by calculation with the use of the following values for the formulae (6) to (9) in the embodiment. In addition, an axis of ordinate in FIG. 7 is normalized by a peak value of frequency response in the case where the thrust fluid bearing 8 shown in FIG. 5 is not added.

$K_2$=469[N/m]

$C_2$=4.13×10$^{-3}$[Ns/m]

L=0.032[m]

$k_n$=k=c

It is apparent from FIG. 7 that the addition of the thrust fluid bearing 8 achieves an increase in effective stiffness $K_{e2}$ and reduction by about 20% in shaft falling vibration.

FIG. 8 shows variations in peak value of the response in the case where bearing stiffness $k_n$, and bearing damping $c_n$ are changed in the newly added thrust fluid bearing 8. Assuming that bearing damping $c_n$ and bearing stiffness $k_n$ increase or decrease in proportion to a coefficient α as in the formulae (8) and (9), an axis of abscissas in FIG. 8 indicates the coefficient α. An axis of ordinate in FIG. 8 indicates peak values of frequency response, which are normalized by a peak value in the case where the thrust fluid bearing 8 is not added.

It is seen from FIG. 8 that when the coefficient α is made small, vibration is decreased in magnitude as compared with the case where the coefficient α equals 1. This is because the bearing damping $c_n$ of the thrust fluid bearing 8 as added is effectively used due to a decrease in dynamic stiffness thereof. On the other hand, when the coefficient α is made to approach 0, which is equivalent to addition of no thrust fluid bearing 8, vibration makes a complete change to be increased in magnitude. In the example of calculation, the coefficient α assumes an optimum value around 0.1, and its peak value amounts to no more than 15% in case of addition of no bearing. Accordingly, by setting the coefficient α in the range of about 0.15 to 0.001, a peak value in response can be decreased to an appropriate range.

Subsequently, an increase in bearing loss, which is caused by addition of the thrust fluid bearing 8, will be described. The relationship represented by a formula (10) exists among items of a fluid dynamic bearing, such as load carrying capacity P, which is in proportion to stiffness, bearing clearance c, bearing diameter R, etc., and the relationship represented by a formula (11) exists between bearing loss H and the items of the bearing.

While the thrust fluid bearing 8 as added has a feature in that it is lower in bearing stiffness $k_n$ and bearing damping $c_n$ than a conventional thrust fluid bearing 7 disposed inside, it is assumed that bearing clearance c is mainly increased to decrease bearing stiffness $k_n$ and bearing damping $c_n$. Examining the formulae (10) and (11), load carrying capacity P is inversely proportional to the square of bearing clearance c and bearing loss H is inversely proportional to bearing clearance c. Accordingly, enlargement of bearing clearance c to decrease bearing stiffness $k_n$ and bearing damping $c_n$ has an effect of the order of the 0.5th power on reduction in bearing loss.

Formula 10

$$P = \frac{C_p \eta \omega R^3}{c^2} \quad (10)$$

Formula 11

$$H = \frac{C_H \eta \omega^2 R^3}{c} \quad (11)$$

FIG. 9 shows results of calculation of such effect. In FIG. 9, an axis of abscissas indicates a proportional constant α for bearing stiffness $k_n$ and bearing damping $c_n$, which are defined in the formulae (8) and (9), and an axis of ordinate indicates bearing loss. Bearing loss is normalized in the case where no thrust fluid bearing 8 is added. Examining the results, it is seen that addition of a thrust fluid bearing 8 achieves an increase in bearing loss and when the thrust fluid bearing 8 is set to have the same stiffness and damping as those of an originally provided bearing, bearing loss is increased by approximately 4 times. On the other hand, in the case where the thrust fluid bearing 8 as added is suppressed in stiffness and damping, it goes well with a small increase in bearing loss. Bearing loss amounts only to 1.3 times when the coefficient α having been optimum in view of reduction in shaft falling vibration is in the neighborhood of, for example, 0.1. Accordingly, it suffices that a thrust fluid bearing 8 as added be small in stiffness and damping, which is found to be preferable in view of reduction in electric power consumption. This can confirm effectiveness in the constitution of the thrust fluid bearing 8 according to the embodiment.

Figure 10:
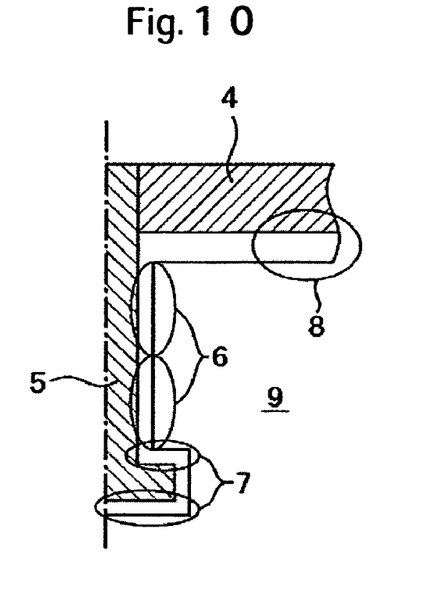
FIG. 10 is an enlarged view showing a bearing portion of a modification 1 of the first embodiment.
Figure 11:
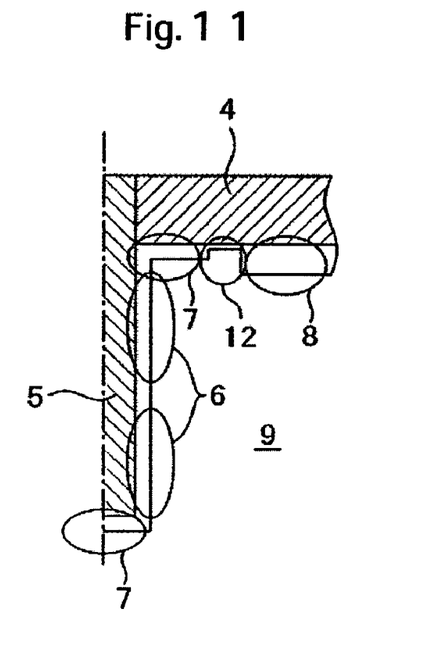
FIG. 11 is an enlarged view showing a bearing portion of a modification 2 of the first embodiment.
Figure 12:
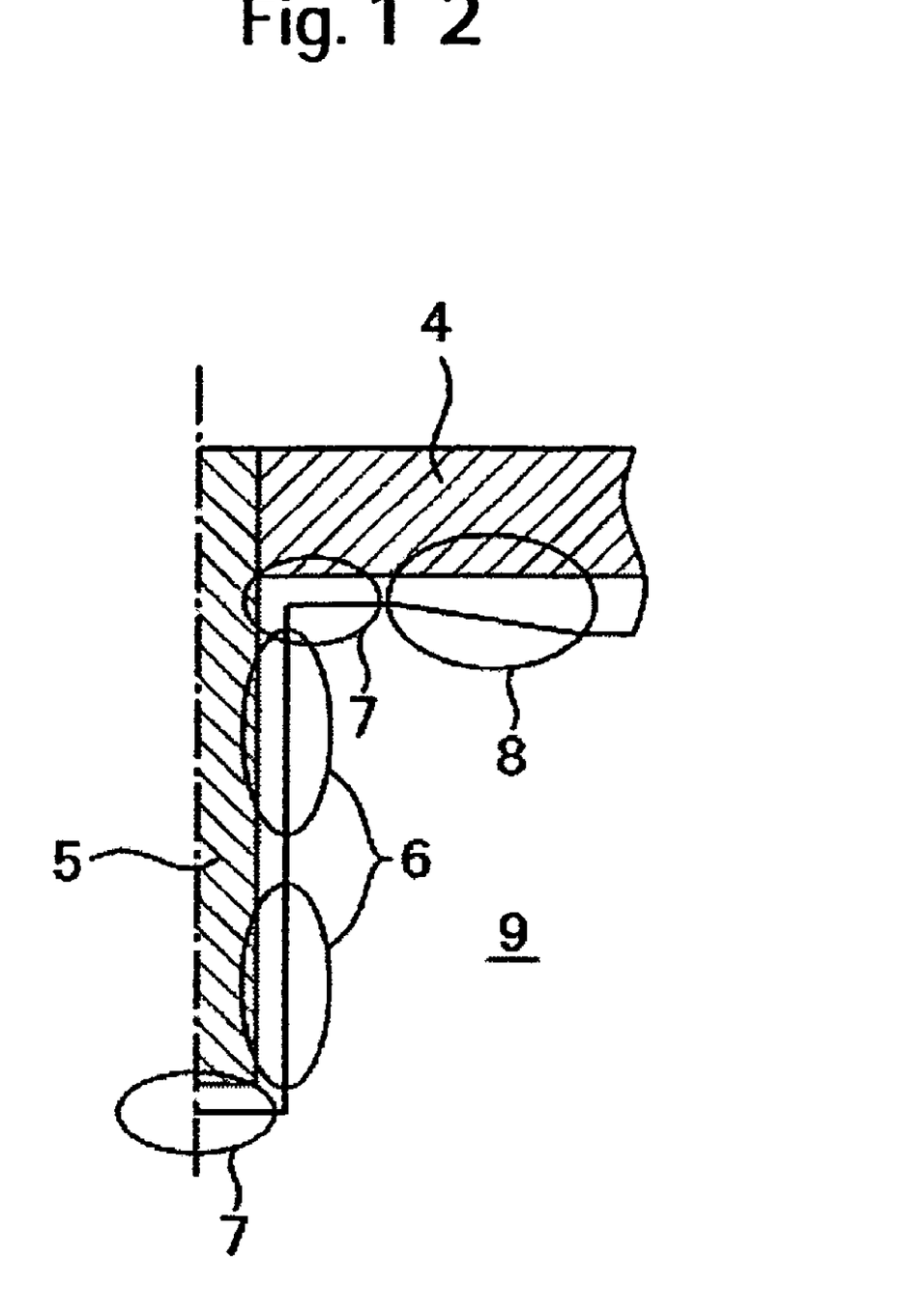
FIG. 12 is an enlarged view showing a bearing portion of a modification 3 of the first embodiment.

FIGS. 10 to 12 show modifications 1 to 3 of the thrust fluid bearing 8 according to the embodiment.

In the modification 1 shown in FIG. 10, a sleeve 9 that forms a thrust bearing 7A arranged inside and a thrust bearing 8 arranged outside is the same in level in an axial direction, that is, the thrust bearing 7A and the thrust bearing 8 that form fluid bearings are the same in clearance, and the thrust fluid bearing 8 is structured to be larger in diameter and clearance than a thrust fluid bearing 7B. In the modification 1, the sleeve 9 can be made simple in shape.

Also, in the modification 2 shown in FIG. 11, a thrust bearing 7A arranged inside and a thrust bearing 8 arranged outside are not the same in level in an axial direction, the thrust fluid bearing 8 is larger in clearance than the thrust fluid bearing 7A, and a seal 12 is provided between the thrust fluid bearing 7A and the thrust fluid bearing 8 to separate the thrust fluid bearing 7A arranged inside from the thrust fluid bearing 8 arranged outside. In the modification 2, it is possible to have the bearing function of the thrust fluid bearing 7A and the bearing function of the thrust fluid bearing 8 surely exhibiting themselves independently, thus enabling suppressing interference between both the fluid bearing functions.

Also, in the modification 3 shown in FIG. 12, a thrust fluid bearing 8 is inclined radially of a thrust fluid bearing 7A to be increased in clearance. In the modification 3, a smooth change in bearing stiffness can be made from the thrust fluid bearing 7A to the thrust fluid bearing 8.

Also, in the modifications 1 to 3, the fundamental effect of the invention can be produced, and effects peculiar to the respective constitutions are produced.

Figure 13:
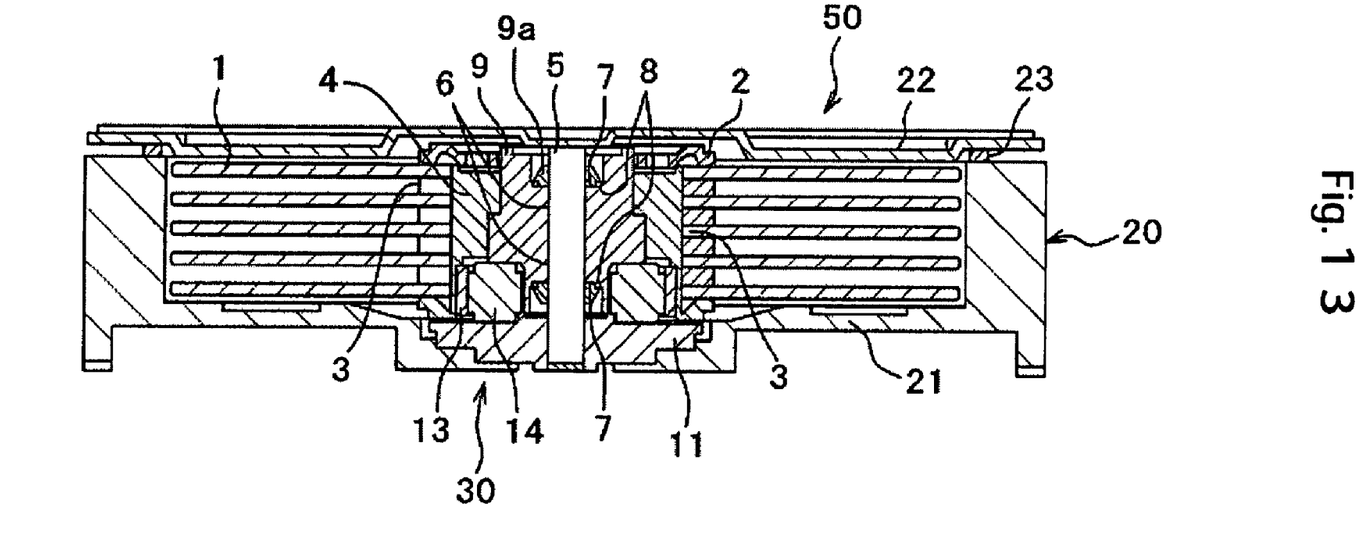
FIG. 13 is a view showing a longitudinal cross section of a magnetic disk device according to a second embodiment of the invention.

Subsequently, a second embodiment of the invention will be described with reference to FIG. 13. FIG. 13 is a view showing, in longitudinal cross section, a drive unit of a magnetic disk device according to the second embodiment. The second embodiment is different from the first embodiment in the following points described below, and fundamentally the same as the first embodiment in other points.

While the first embodiment provides an example of a rotating shaft construction, in which the shaft 5 is cantilevered in structure, the second embodiment provides an example of a fixed shaft construction, in which a shaft 5 is supported at both ends. In the second embodiment, a thrust fluid bearing 7 and a thrust fluid bearing 8 are formed between a second sleeve 9, which is fixed to a hub 4 to rotate, and a first sleeve 9a, which is fixed to the shaft 5 not to rotate, the thrust fluid bearing 8 being formed to be larger in diameter and deeper in clearance than the first thrust fluid bearing 7. Also, the thrust fluid bearing 7 and the thrust fluid bearing 8 are formed symmetrically on upper and lower surfaces of the sleeve 9. According to the second embodiment, it is possible to surely decrease shaft falling vibration in the fixed shaft construction.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A magnetic disk device comprising a magnetic disk that records information, and a drive unit that rotates the magnetic disk about a shaft, wherein:
    the drive unit comprises a rotary section that holds the magnetic disk, and a stationary section that supports the rotary section through a fluid bearing,
    the fluid bearing comprises a radial fluid bearing that bears a load in a direction perpendicular to an axial direction, and a thrust fluid bearing that bears a load in the axial direction, and
    the thrust fluid bearing comprises a first thrust fluid bearing having a diameter and a clearance, and a second thrust fluid bearing positioned outside an outer periphery of the shaft and being larger in diameter and deeper in clearance than the first thrust fluid bearing;
    wherein the rotary section comprises a shaft that defines a center of rotation, a hub fixed to the shaft to hold the magnetic disk, and a motor rotor that rotates the hub, and the stationary section comprises a sleeve arranged on an outer periphery of the shaft, and a motor stator, the radial fluid bearing is formed between the shaft and the sleeve, and the second thrust fluid bearing is formed between the sleeve and the hub;
    wherein juxtaposed between an upper surface of the sleeve and a lower surface of the hub are the first thrust fluid bearing on an inner peripheral side of the shaft and the second thrust fluid bearing on an outer peripheral side of the first thrust fluid bearing;
    wherein the second thrust fluid bearing is formed by an inclined surface inclined so as to become deep in clearance radially outwardly of the first thrust fluid bearing formed on the upper surface of the sleeve.

2. The magnetic disk device according to claim 1, wherein the second thrust fluid bearing is defined by a groove formed wholly circumferentially on the upper surface of the sleeve.

3. The magnetic disk device according to claim 2, wherein the second thrust fluid bearing has a proportional coefficient of bearing stiffness and beading damping that ranges from about 0.15 to 0.001.

4. The magnetic disk device according to claim 1 wherein the first thrust fluid bearing comprises an upper thrust fluid bearing formed between an upper surface of the sleeve and a lower surface of the hub, and a lower thrust fluid bearing formed between a lower surface of the shaft and a bottom surface of the sleeve.

5. The magnetic disk device according to claim 1, wherein the stationary section comprises a shaft that defines a center of rotation, first sleeves fixed to an outer periphery of the shaft, and a motor stator, and the rotary section comprises a second sleeve arranged on the outer periphery of the shaft, a hub fixed to the second sleeve to hold the magnetic disk, and a motor rotor that rotates the hub, and wherein the radial fluid bearing is formed between the shaft and the second sleeve, and the first thrust fluid bearing and the second thrust fluid bearing are formed between the first sleeves and the second sleeve.

6. The magnetic disk device according to claim 5, wherein the first sleeves are arranged above and below the second sleeve, and the first thrust fluid bearing and the second thrust fluid bearing are formed between upper and lower surfaces of the second sleeve and the respective first sleeves.

7. The magnetic disk device according to claim 1, further comprising a seal disposed between the first thrust fluid bearing and the second thrust fluid bearing.

8. The magnetic disk device according to claim 7, wherein the rotary section comprises a shaft that defines a center of rotation, a hub fixed to the shaft to hold the magnetic disk, and a motor rotor that rotates the hub, and the stationary section comprises a sleeve arranged on an outer periphery of the shaft, and a motor stator, the radial fluid bearing is formed between the shaft and the sleeve, and the second thrust fluid bearing is formed between the sleeve and the hub.

9. The magnetic disk device according to claim 8, wherein juxtaposed between an upper surface of the sleeve and a lower surface of the hub are the first thrust fluid bearing on an inner peripheral side and the second thrust fluid bearing on an outer peripheral side.

10. The magnetic disk device according to claim 9, wherein the second thrust fluid bearing is defined by a groove formed wholly circumferentially on the upper surface of the sleeve.

11. The magnetic disk device according to claim 10, wherein the second thrust fluid bearing has a proportional coefficient of bearing stiffness and beading damping that ranges from about 0.15 to 0.001.

12. The magnetic disk device according to claim 7, wherein the stationary section comprises a shaft that defines a center of rotation, first sleeves fixed to an outer periphery of the shaft, and a motor stator, and the rotary section comprises a second sleeve arranged on the outer periphery of the shaft, a hub fixed to the second sleeve to hold the magnetic disk, and a motor rotor that rotates the hub, and wherein the radial fluid bearing is formed between the shaft and the second sleeve, and the first thrust fluid bearing and the second thrust fluid bearing are formed between the first sleeves and the second sleeve.

13. The magnetic disk device according to claim 12, wherein the first sleeves are arranged above and below the second sleeve, and the first thrust fluid bearing and the second thrust fluid bearing are formed between upper and lower surfaces of the second sleeve and the respective first sleeves.

* * * * *

UNITED STATES PATENT AND TRADEMARK OFFICE
CERTIFICATE OF CORRECTION

PATENT NO.         : 7,520,674 B2
APPLICATION NO.    : 11/303282
DATED              : April 21, 2009
INVENTOR(S)        : Nakamiya et al.

It is certified that error appears in the above-identified patent and that said Letters Patent is hereby corrected as shown below:

Column 6, line 35, please delete "$l = 3.64 \times 10^{-6}$ [kg•m$^{2]}$" and insert
-- $\mathbf{l = 3.64 \times 10^{-6}}$ [kg•m$^2$] --

Column 6, line 44, please delete "$k = 1.57 \times 10\text{-}6$ [N/M]" and insert
-- $\mathbf{k = 1.57 \times 10^{-6}}$ [N/m] --

Signed and Sealed this

Sixteenth Day of June, 2009

JOHN DOLL
*Acting Director of the United States Patent and Trademark Office*